US005277077A

United States Patent [19]
Osborn

[11] Patent Number: 5,277,077
[45] Date of Patent: Jan. 11, 1994

[54] MODULAR VEHICLE SHIFTER AND METHOD OF MANUFACTURE

[75] Inventor: Charles Osborn, Spring Lake, Mich.

[73] Assignee: Grand Haven Stamped Products, Div. of JSJ Corporation, Grand Haven, Mich.

[21] Appl. No.: 951,910

[22] Filed: Sep. 28, 1992

[51] Int. Cl.⁵ .............................................. G05G 5/06
[52] U.S. Cl. ...................................... 74/475; 74/527; 29/401.1; 29/453; 29/434
[58] Field of Search .................. 74/475, 527; 29/401.1, 29/453, 434

[56] References Cited

U.S. PATENT DOCUMENTS

| | | | |
|---|---|---|---|
| 2,961,890 | 11/1960 | Marshall | 74/477 |
| 3,998,109 | 12/1976 | O'Brien | 74/475 |
| 4,232,571 | 11/1980 | Kimberlin | 74/878 |
| 4,326,432 | 4/1982 | Miller | 74/475 |
| 4,612,820 | 9/1986 | Behrens | 74/475 |
| 5,062,509 | 11/1991 | Carpenter et al. | 192/4 A |

OTHER PUBLICATIONS

Exhibits A-C are drawings disclosing three different shifter detent assemblies that were publicly shown or offered for sale by Grand Haven Stamped Products Company, a division of JSJ Corporation, assignee to the present invention, more than one year prior to the filing of the present application.

Primary Examiner—Leslie A. Braun
Assistant Examiner—William O. Trousdell
Attorney, Agent, or Firm—Price, Heneveld, Cooper, DeWitt & Litton

[57] ABSTRACT

A modular vehicle transmission shifter mechanism and method of manufacture in which the shifter mechanism is so constructed that it is adapted for use with different transmissions of different vehicles by providing standard components for supporting a pawl detent member and a position feel detent member. The standard components include a detent support member having attachments cooperating with attachments on the detent members, such attachments for each pawl member and said attachments for each position feel detent member being identical requiring only the change in configuration in the notches of the pawl detent member and the undulations in the position feel detent member. This shifter includes a unique shifting handle assembly and an improved support structure for the detent support member.

22 Claims, 6 Drawing Sheets

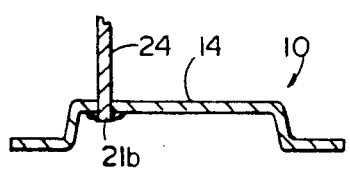
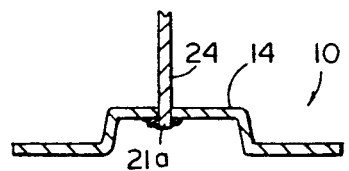
FIG. 6  FIG. 7
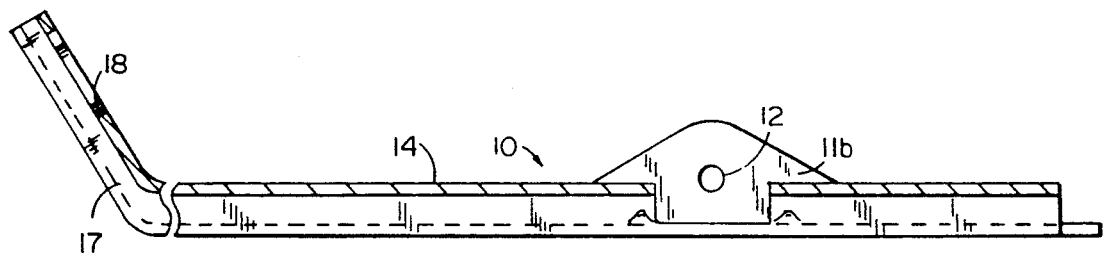
FIG. 8
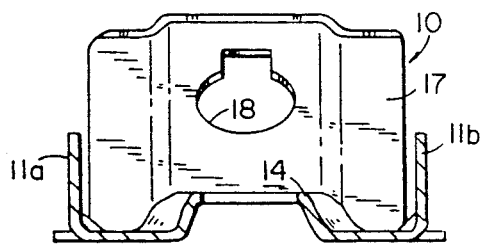
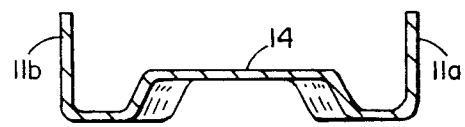
FIG. 10  FIG. 11
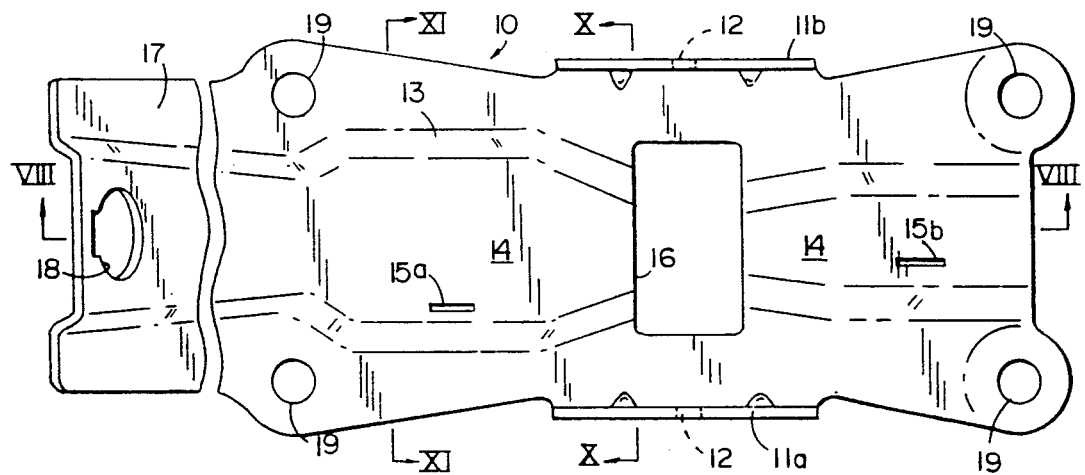
FIG. 9

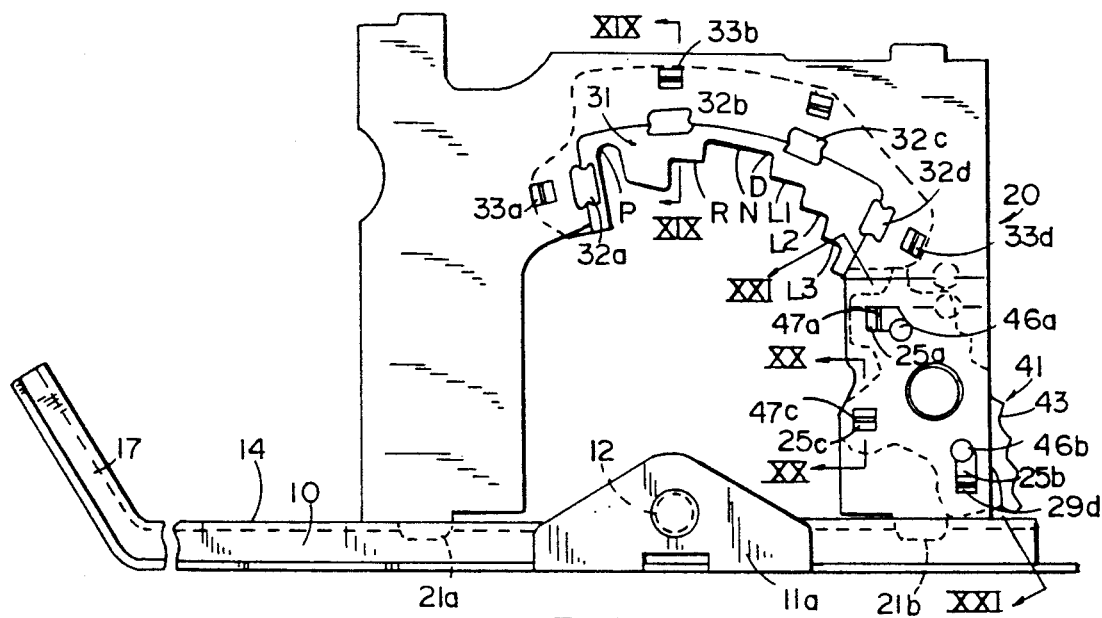

MODULAR VEHICLE SHIFTER AND METHOD OF MANUFACTURE

FIELD OF THE INVENTION

This invention relates to a vehicle transmission shifter mechanism and method of manufacturing the same, and particularly, to such a mechanism and method in which the shifter mechanism is so constructed that it is adapted to be used for the transmissions of different vehicles requiring different throws. It also relates to a unique shifter handle construction and to an improved means for mounting a detent support plate on the base for the shifter.

BACKGROUND OF THE INVENTION

In the automotive industry, there is a multitude of different shifters constructed for different vehicles. This has been necessary because primarily, the transmission of each vehicle requires different throws (degrees of pivotable movement) of the shifter lever in being shifted from park to reverse, neutral, drive, and low gears. The present-day practice to accomplish the desired throws for each of the vehicles, has been to design a shifter for each of the vehicles. Although the components for each of the shifters are somewhat alike, it has been the practice to design, develop, and tool up for each of the shifters. Although similar components are used in each of the shifters, particularly by any one manufacturer, these specific designs for each shifter have required substantially different tooling for each shifter which is very costly. Further, each design requires substantial testing and frequently redesign of the shifter to accomplish the desired function including the throws of the shifter lever. By "throw" it is meant the degree of rotation of the shifter lever for each of the desired positions of the shift lever as determined by the pawl being movable with the shift lever in and out of notches of a pawl detent member.

Frequently, in addition to the pawl being movable with the shift lever, an arm is connected for movement with the shift lever for giving feel to the operator of the position of the shift lever. Mounted on the end of the arm is a member such as a roller that rolls on a roller detent surface that has undulations corresponding to the position of the pawl in the various park, reverse, neutral, drive, and low selector positions herein referred to as the P-R-N-D-L selector positions. The undulations in the roller detent must be designed to match the throws for the various selector positions of each shifter. Accordingly, it has been the practice in designing a shifter for different transmissions to redesign the entire shifter by modifying all the components closely associated not only with the pawl detent member but also with the roller detent. As previously stated, these modifications were made by designing entirely new shifters and consequently, making new tooling for substantially all components for each of the shifters so designed.

SUMMARY OF THE INVENTION

It is the object of this invention to provide an improved design of a shifter and method of making in which essentially all of the components are utilized for different shifters of different vehicles The only change required for each vehicle is to provide a different pawl detent member and roller detent member for each vehicle. The pawl detent plate and roller detent members can be separate pieces or one molded piece. The only difference in the detent members for one vehicle and another vehicle is in the shape of the notches of the pawl detent and the shape of the undulations in the roller detent, such notches and undulations establishing the P-R-N-D-L selector positions or in other words, the throw of the shifter lever for each of the selector positions.

In accordance with this invention, the base, the detent support plate, and the shifter lever handle are all the same components. The detent support plate includes attachment means for attaching the pawl detent member and the roller detent member either separately or in one piece to the detent support plate. The pawl detent member and the roller detent member also include the identical attachment means located thereon regardless of the vehicle for which the detent members are designed. The two attachment means are thus always in position for securing the detent members to the detent plate support member, thus establishing the proper position of the notches and undulations in the pawl detent member and roller detent member, respectively.

It will be seen that the arrangement as above-described provides for a limited amount of tooling in order to construct vehicle transmission shifters for different vehicles. As previously stated, the only changes are in the pawl detent member and the roller detent member and on such members, the only changes are the shapes and positions of the notches and the undulations, respectively.

It is also an object of this invention to provide a unique shift lever handle assembly having a limited number of parts and constructed of parts that can be actuated more smoothly and with less effort. Still another object of this invention is to provide a means for supporting the detent plates' support plate in a more accurate upright position by the simple change in providing a trough running longitudinally of the base of the vehicle transmission shifter thus providing a portion of the base raised above the surface on which the base is supported. The detent support plate is provided with tabs extending downwardly through openings in the plate forming the top of the trough. The detent support plate is welded to the bottom surface of the trough and to the tabs which extend longitudinally of the base.

BRIEF DESCRIPTION OF THE DRAWINGS

FIG. 6 is a cross-sectional view taken along the plane VI—VI of FIG. 1;

FIG. 7 is a cross-sectional view taken along the plane VII—VII of FIG. 1;

FIG. 8 is a side-elevational, cross-sectional view of the base forming a component of the vehicle transmission shifter of this invention;

FIG. 9 is a plan view of the base of FIG. 8;

FIG. 10 is a cross-sectional, elevational view of the base of FIGS. 8 and 9 taken along the plane X—X of FIG. 9;

FIG. 11 is a cross-sectional view of the base taken along the XI—XI of FIG. 9;

FIG. 17 is a side-elevational view of the other side of the roller detent member of FIG. 15;

FIG. 18 is a side-elevational view of a subassembly of the vehicle transmission shifter of the invention showing the base, the detent plate support, the pawl detent member and roller detent member, the pawl detent and roller detent members being formed of one piece;

FIG. 19 is a cross-sectional view taken along the plane XIX—XIX of FIG. 18;

FIG. 20 is a cross-sectional view taken along the plane XX—XX of FIG. 18;

FIG. 21 is a cross-sectional view taken along the plane XXI—XXI of 18;

FIG. 22 is a cross-sectional view of the shift lever handle assembly forming an assembled component of this invention;

DESCRIPTION OF THE INVENTION

Figure 1:
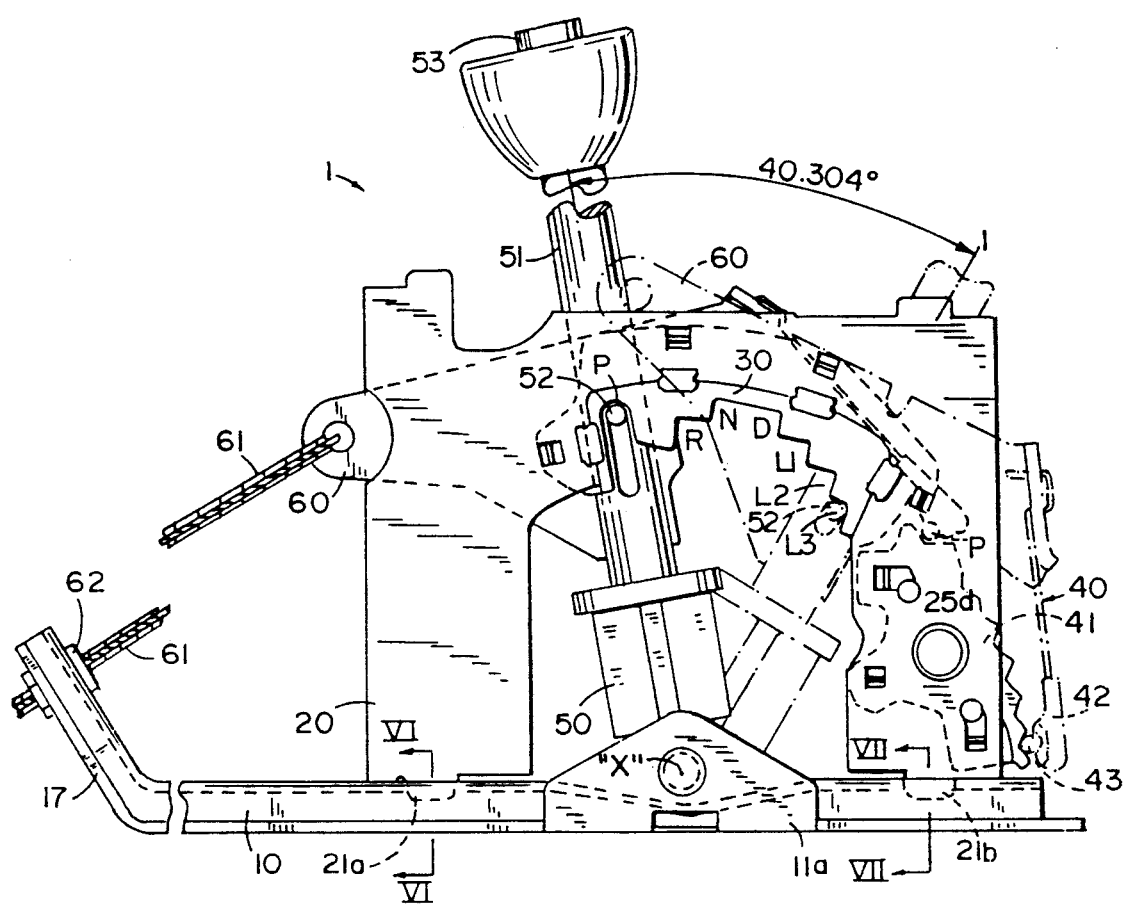
FIG. 1 is a side-elevational view of a vehicle transmission shifter according to this invention.
Figure 2:
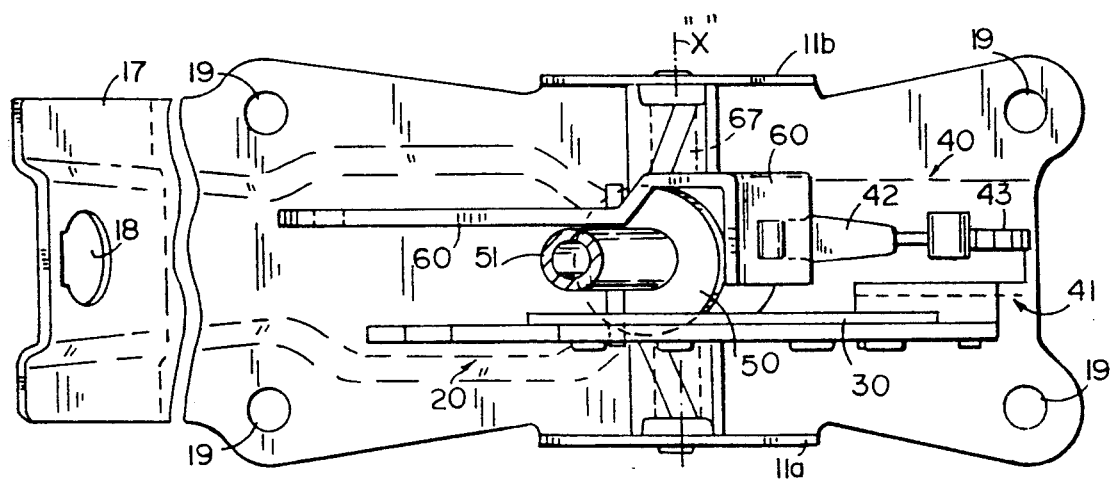
FIG. 2 is a plan view of the shifter of FIG. 1.
Figure 3:
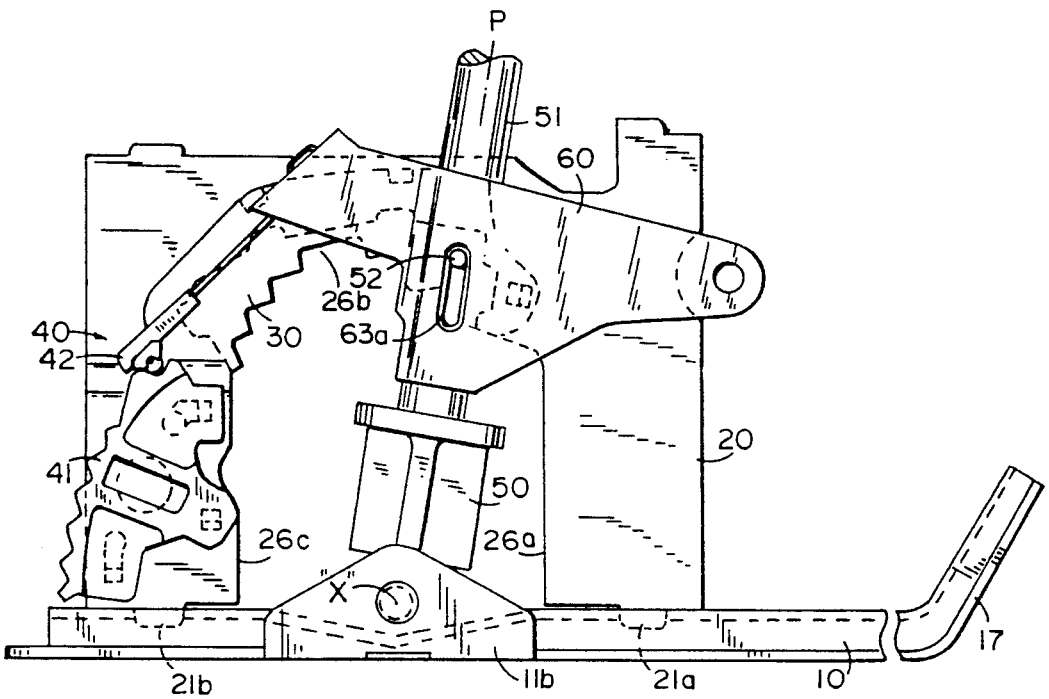
FIG. 3 a side-elevational view of the shifter mechanism of FIG. 1 showing the opposite side thereof.

Referring to FIGS. 1, 2, and 3, the shifter mechanism 1 in accordance with this invention comprises a stamped steel base 10 on which is mounted a vertical detent support plate 20 supporting the pawl detent member 30 and a roller detent member 41 which is a part of the position feel assembly 40. A shift lever handle assembly 50 is pivotally mounted on the base 10. Secured to the shift lever handle assembly is the cable actuator arm 60 to which the cable 61 is attached for actuating the transmission in response to the pivotal movement of the shift lever 51. The shift lever handle assembly includes the pawl 52, which as will be explained in greater detail hereinafter, is movable to different selector positions, including park, reverse, neutral, drive, 2nd low, and 3rd low positions frequently referred to as P-R-N-D-L$_1$-L$_2$ selector positions. These positions are determined by the position and shape of the notches in the pawl detent member 30 as will be explained hereinafter.

A position feel arm 42 is connected to one end of the cable actuator arm opposite the end to which the cable 61 is attached This arm 42 includes a roller 43 which rides in the rooster-comb-shaped undulated surfaces of the roller detent member 41.

The shift lever handle assembly includes a button 53 at the top of the shift lever 51 which when pushed downwardly, actuates the pawl 52 permitting the shift lever 51 to be rotated about the axis "X" to various selected shift positions P-R-N-D-L$_1$-L$_2$.

Referring now to the various components as briefly described above, FIGS. 6, 7, 8, 9, 10, and 11 disclose the construction of the stamped steel base which includes an elongated stamped member having a pair of ears 11 extending upwardly intermediate the ends thereof and having the openings 12 for receiving an axle 61 (FIGS. 2 and 22) above which the shift lever handle assembly 50 is pivoted. A trough 13 extends the entire length of the base 10 and defines an upper surface 14 through which the elongated openings 15 are provided to receive the tabs 21$a$ and 21$b$ of the detent support plate 20 (FIGS. 1, 6, and 7). The opening 16 is provided to aid in assembly and accommodate the pile up of the material as the trough 13 is being formed.

The front end of base 10 is bent at an angle to provide a flange 17 in which an opening 18 is provided for mounting a circlip 62 through which the cable 61 extends (FIG. 1). The openings 19 are provided in each corner of the base for receiving bolts (not shown) to secure the base on a support surface within the vehicle.

The detent support plate is disclosed in greater detail in FIGS. 4–7. The detent support plate is a stamped member having an upper portion 22 and having two laterally offset legs 23 and 24 (FIG. 5) extending downward from the upper portion 22. Each leg 23 and 24 has a tab 21$b$ and 21$a$, respectively. The tabs extend through openings 15$a$ and 15$b$ in the raised surface 14 and as disclosed in FIGS. 6 and 7, are welded to the underside of the raised portion 1 along each side of the tabs. This construction provides an accurate, vertical orientation of the detent support plate relative to the horizontally raised surface 14.

Figure 4:
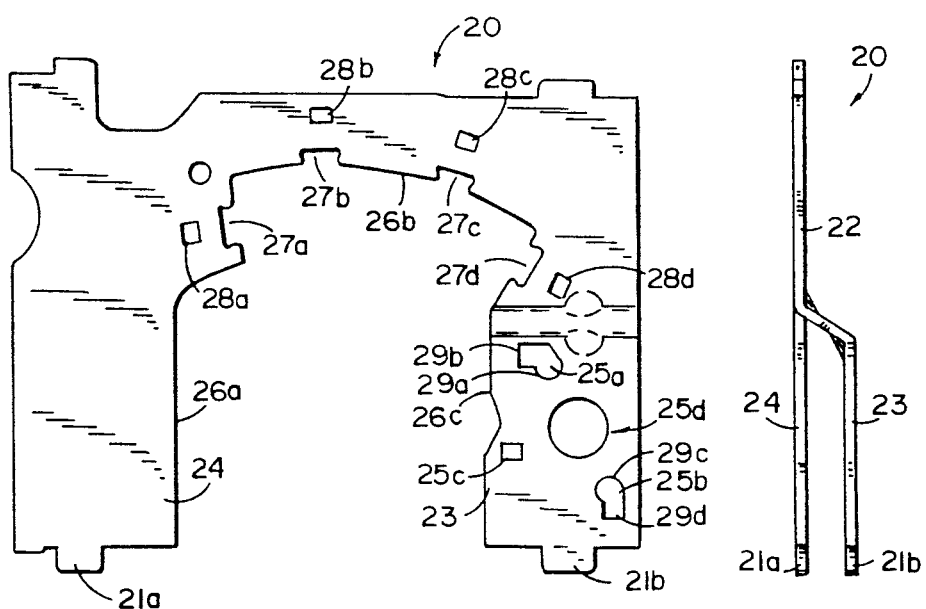
FIG. 4 is a side-elevational view of the detent support plate forming a component of the vehicle transmission shifter of this invention.
Figure 5:
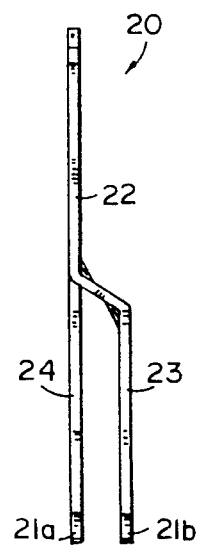
FIG. 5 is an end view of the detent support plate of FIG. 4.

As disclosed in FIGS. 1, 3, and 4 the detent support plate is inverted U-shaped so as to provide the edges 26$a$, 26$b$, and 26$c$. The edge 26$b$ of the upper portion 22 of the detent support plate 20 has four cutouts or openings 27$a$, 27$b$, 27$c$, and 27$d$. Spaced from each of these cutouts or openings are the openings 28$a$, 28$b$, 28$c$, and 28$d$. As will be explained hereinafter, openings 27$a$ and 28$a$, etc. are provided for mounting the pawl detent member 30 by snap-in action as will be described hereinafter. The leg 23 provides the openings 25$a$, 25$b$, 25$c$, and 25$d$. The opening 25$a$ includes arcuate section 29$a$ and a rectilinear section 29$b$ oriented at an angle from each other. The opening 25$b$ includes the arcuate section 29$c$ and rectilinear section 29$d$. The purpose of the curvilinear or arcuate sections arranged on an angle to the rectilinear sections will become obvious hereinafter in a description of the snap-in mounting of the pawl detent member.

Figure 12:
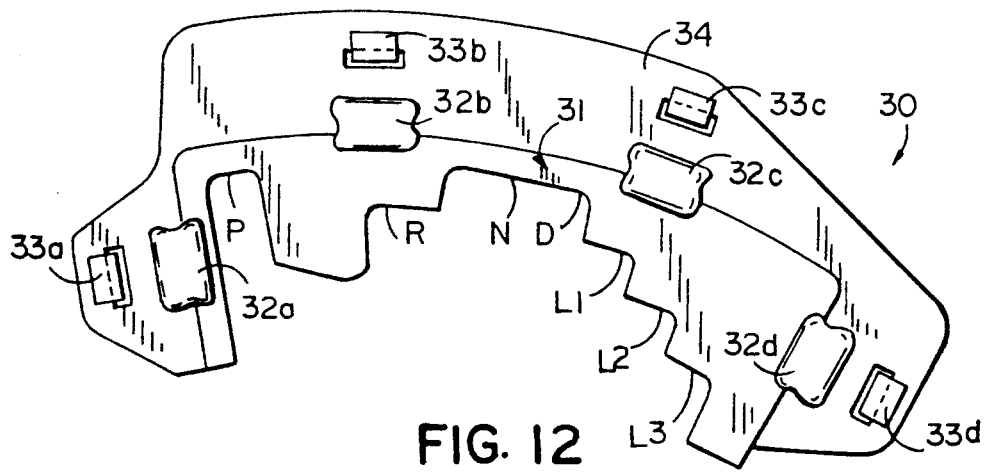
FIG. 12 is a side-elevational view of the pawl detent member forming a component of this invention.
Figure 13:
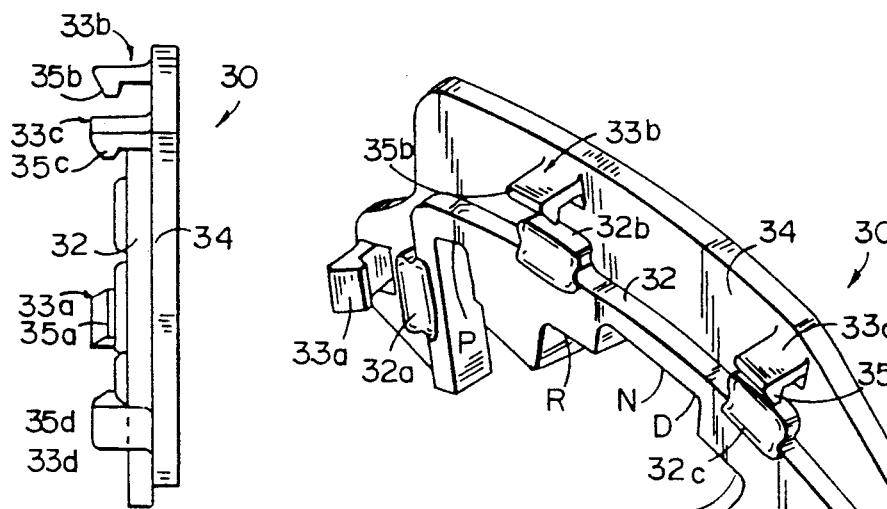
FIG. 13 an end view of the pawl detent member of FIG. 2.
Figure 14:
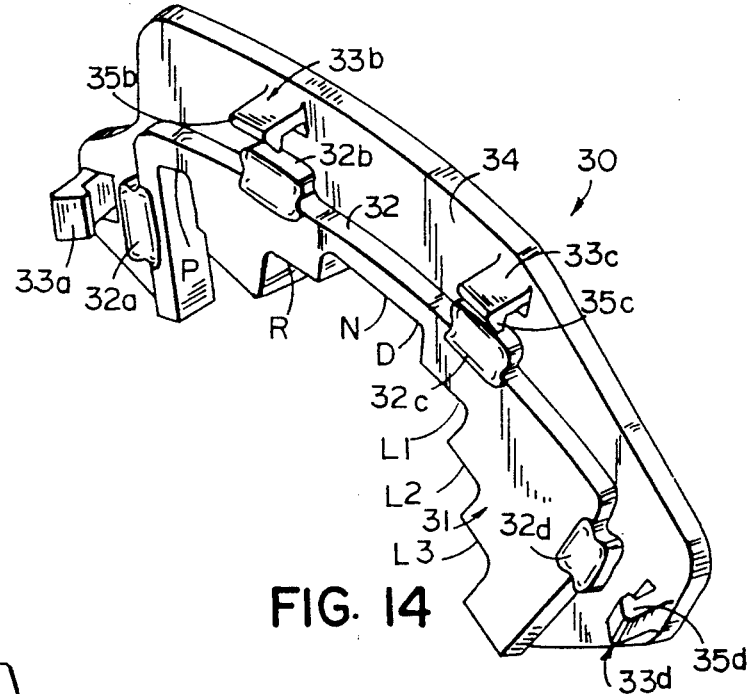
FIG. 14 is a side-elevational, perspective view of the pawl detent member of FIG. 12.

FIGS. 12, 13, and 14 disclose the details of the pawl detent member which is a molded plastic part configured to mount on the detent support plate 20. It includes a body having a protrusion 31 having an upper surface 32 shaped identical to the edge 26$b$ of the upper portion 22 of the detent support plate including the protuberances 32$a$, 32$b$, 32$c$, and 32$d$ shaped to exactly fit into the notches or openings 27$a$, 27$b$, 27$c$, and 27$d$. Hook-shaped fingers 33$a$, 33$b$, 33$c$, and 33$d$ are provided on the flange portion 34 of the pawl detent member and are positioned to extend through the openings 28$a$, 28$b$, 28$c$, and 28$d$ of the detent support plate. The fingers 33$a$, 33$b$, 33$c$, and 33$d$ have hook portions 35$a$, 35$b$, 35$c$, and 35$d$ with chamfered surfaces. Hook portions are sufficiently resilient to flex as they are pushed into the openings 28$a$, 28$b$, 28$c$, and 28$d$ with the chamfered surfaces camming against the edges of the openings. When forced entirely through the openings, they snap back so that the hook portions 35a, 35kb, 35c, and 35d are hooked behind the edge and one face of the detent support plate to hold the pawl detent member securely in place.

Figure 15:
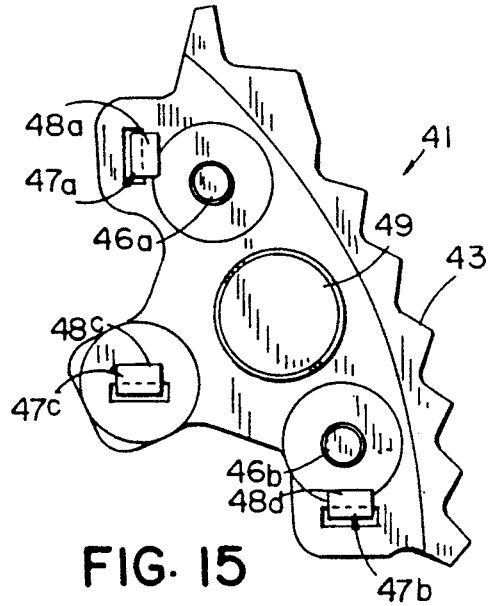
FIG. 15 is a side-elevational view of the roller detent member forming a component of this invention.
Figure 16:
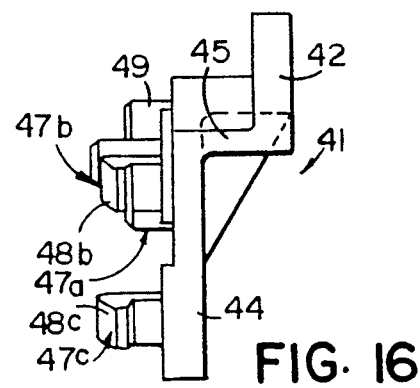
FIG. 16 is an end view of the roller detent member of FIG. 15.

The pawl detent member has a plurality of notches P, R, N, D, $L_1$, and $L_2$ which corresponds to the selective positions of the pawl 52 for shifting the shifting mechanism to either park, reverse, neutral, drive, 2nd low, and 3rd low, respectively FIGS. 15, 16, and 17 disclose the details of the roller detent member 41 having a portion 42 with an undulated upper edge or so-called "rooster-comb-type" detent formation 43. The portion 42 is offset from a support flange 44, the portion 42 and flange 44 being connected by an intermediate web 45. Support flange 44 has means for attaching the roller patent member to detent support plate 20. Such means includes the posts 46a and 46b protruding from the support flange 44 and the hook-like fingers 47a, 47b, and 47c also protruding from the support flange. The post 46a and fingers 47a are spaced from each other and positioned to be received within the openings 25a and 25b, respectively, of the detent support plate with the post located in the sections 29a and 29c and the fingers located in the rectilinear portions 29b and 29d (FIGS. 4 and 18). The fingers are sufficiently long to extend through the detent support plate with the hook portions 48a, 48b, and 48c hooked over the edge of the openings 25a, 25b, and 25c. An enlarged centering post 49 also protrudes from the support flange 44 and is received within the opening 25d of the detent support plate 20.

FIGS. 18, 19, 20, and 21 disclose the pawl detent member 30 and roller detent member 41 mounted on the detent support plate 20. It will be noted from these figures that the combination of the protuberances such as 32b and the fingers such as 33b provide a means for rigidly holding the pawl detent member in place (see FIG. 19). Also, FIG. 21 illustrates how the roller detent member 41 is rigidly mounted on the detent support plate 20 by the posts 46a and 46b and the hooked fingers 47a and 47b along with the large post 49 and hooked fingers 47c (FIG. 20) contributing to this rigid mounting of the roller patent member 41 on the detent support plate 20. It will be noted in FIG. 18 that in accordance with one embodiment of this invention, the pawl detent member and the roller detent member can be one integrally molded piece.

Figure 23:
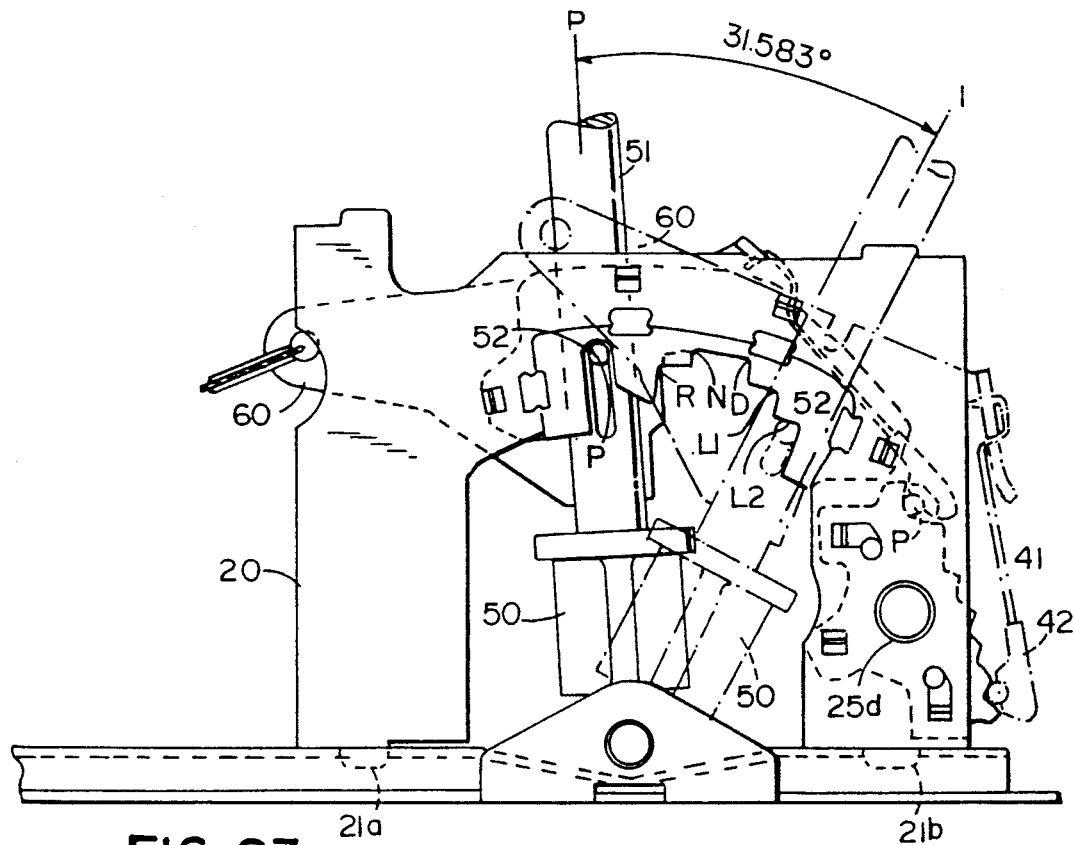
FIG. 23 is a side-elevational view similar to that of FIG. 1 but having differently shaped pawl detent and roller detent members which provide different throws than that of FIG. 1 and thereby adapted for a different vehicle than the shifter of FIG. 1.
Figure 24:
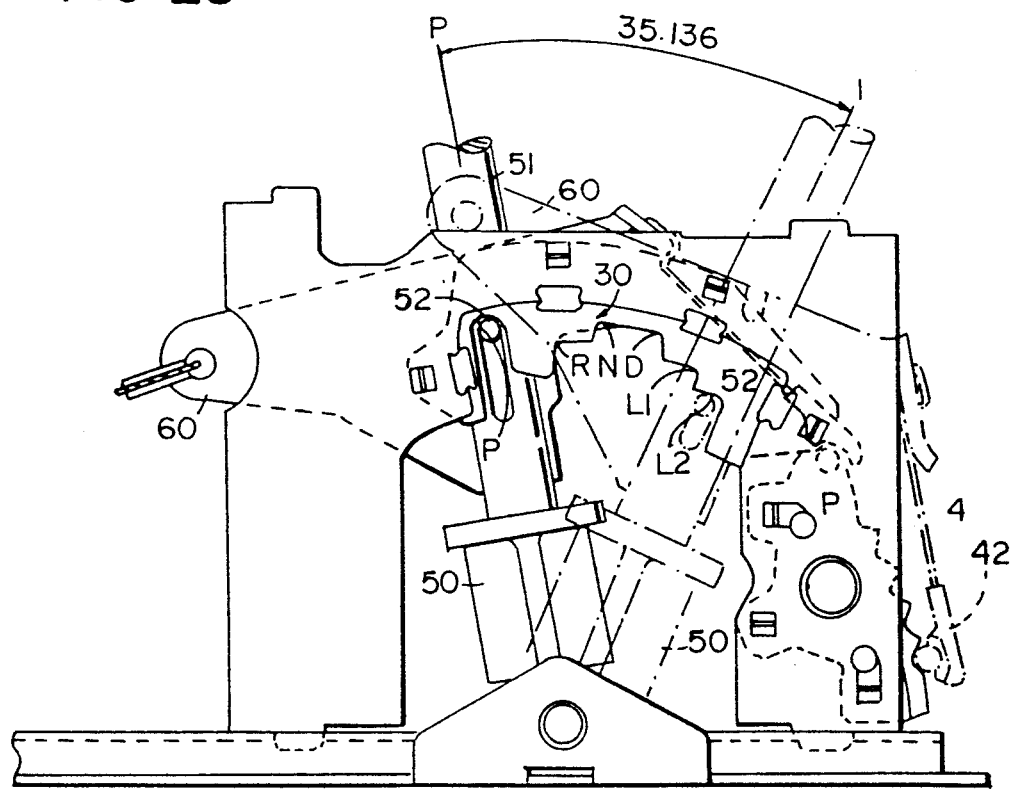
FIG. 24 is still another side-elevational view of a shifter similar to that of FIGS. 1 and 23 but showing another set of pawl detent and roller detent members for still another transmission of a different vehicle.

Of upmost importance to the concept of this invention and the reason for the snap-in feature is that this invention permits the adaption of the shifter to any number of throws as required by different transmissions of different vehicles. This is demonstrated by a comparison of FIGS. 1, 23, and 24. For example, FIG. 1 shows a total throw of the lever from the park position to the low gear position $L_2$ requiring a pivoting of the shift lever 51 40.304° whereas FIG. 23, which is a shifter for a three-speed short throw, the degree of rotation of the shift lever from park to low is 31.583° and in FIG. 24, which is a three-speed long throw, the degree of rotation of the shift lever from park to low is 35.136°. Thus, each of the three shifters of FIGS. 1, 23, and 24 are for different transmissions for different vehicles. However, the change in the shifter is accomplished by simply substituting a different pawl detent member and a different roll detent member which are different only in shape and position of the pawl notches and the roller undulations. All detent members in accordance with this invention are otherwise identical and are adapted to be mounted in the same fashion and in exactly the same way.

FIG. 22 discloses the details of the shift lever handle assembly 50 which includes a shift lever formed of a base member 54 which is a molded plastic member having relatively high lubricity. It has a central portion 54a with flanges 54b and 54c forming a truncated shape in cross-section with legs 55a and 55b at their lower ends and aligned bores 56a and 56b extending laterally therethrough for receiving the stationary pin 61 about which the base member is pivotally mounted. The base member 54 has a pair of wings 57a and 57b, one on each side and when not installed normally, projecting beyond the dimension between the two ears 11a and 11b. Thus, when inserted between the ears 11a and 11b, the wings-57a and 58b contact the ears and are flexed inwardly thus centering the base member 54 between the ears 11a and 11b to minimize the frictional engagement between the base member and the ears. The central portion 54a has an opening 66 receiving the handle 51.

The handle 51 of the shift lever assembly is formed of a hollow tube 58 in which is located a cylindrical plug 59 slideably mounted within the tube 58 and having an opening 64 receiving the pawl 52 which extends through the slots 63a and 63b, one on each side of the tube and located opposite each other for slideably receiving the pawl 52 upwardly and downwardly. The plug 59 is biased upwardly by the spring 65 and is adapted to be forced downwardly against the bias of the spring 65 by a so-called straw 66 operatively connected to the button 53. Thus, applying a force to the button 53 forces the pawl 52 downwardly out of the notches P, R, N, D, $L_1$, and $L_2$ permitting the pivoting of the shift lever 51 into the desired selected transmission position.

ASSEMBLY AND OPERATION

The shift lever mechanism of this invention is constructed of five components or subassemblies including the base 10 which is a stamped member as described above, a detent support plate 20 which is also a stamped member, the shift lever handle assembly 50 and the two detent members including the pawl detent member 30 and the roller detent member 41. Regardless of on what vehicle or with what transmission the shifter mechanism is to be utilized, the base 10, the detent support plate 20, and the shift lever handle assembly 50 are essentially all the same. The length and shape of tube 51 may be different requiring a different straw 66. In other words, this subassembly is made up of these components and requires no modification whatsoever regardless of the transmission with which the shifter mechanism is to be utilized. When the throws for a specific transmission are determined, the notches in the protrusion 31 is designed to correspond with the throws required for each of the positions P, R, N, D, and L. This is the only design required. No other relationship between all the other parts of the shifter are necessary to be designed. Except for the shape of the notches, the other configurations of the pawl detent member including the protrusion 31, protuberances 32a, 32b, 32c, and 32d and fingers 33a, 33b, 33c, and 33d are all the same. This permits substantially the same portion of a plastic mold to be utilized except for the notches in the protrusion 31.

The roller detent member utilized to provide the feel of the position of the lever also requires minimal change in design. The only change required is the location of the undulations or rooster-comb-detent formations 43.

Having selected and molded the proper position of the notches in the pawl detent member and the undulations in the roller detent member, detent members 30 and 41 are snapped into place as previously described. The shifter mechanism is then ready for installation on the vehicle.

The construction of the present shifter makes possible stamping a large number of bases 10, a large number of detent support plates and constructing a large number of handle assemblies 50 and inventoring the same for use on any number of subsequent shifters for future transmissions requiring different throws and when a shifter having them with different throws is required, assembling a pawl detent member and roller detent member designed to provide such desired throw.

In the operation, the shifter mechanism is shifted by pressing the button 53 causing the pawl 52 to be forced out of the park notch P permitting the shift lever to be rotated to any one of the notches R, N, D, $L_1$ or $L_2$. It automatically follows that the roller on the end of the roller detent arm 42 rides in the undulations which are provided to give a feel for each of the selected positions.

Having described my invention, it should be evident that although I have described the preferred embodiments, other embodiments are possible without departing from the spirit of this invention.

The embodiments of the invention in which an exclusive property or privilege is claimed are defined as follows:

1. In a vehicle transmission shifter mechanism having an upright detent member mounted on an upright detent support plate having an inverted U shaped with an upper portion and spaced legs that point in a downward direction and that project from ends of the upper portion to define a space between said legs and said upper portion; said space defined by an edge of said upper portion and said legs; said detent member having an edge portion with notches for receiving a pawl movable within said space; a shift lever shiftable to a plurality of different shift positions, said positions being determined by a pawl movable vertically and horizontally in said space with said shift lever into and out of said notches of said detent member; the improvement comprising:

means for constructing said mechanism for adapting it to be used for different throws of said shift lever whereby the same shift lever and pawl and the same detent support plate can be utilized for different vehicles having transmissions requiring different throws;

said means including said edge portion of said detent member extending downwardly below said edge of said upper portion with said notches located below said edge of said upper portion so that said detent member provides the sole means for positioning said pawl and shift lever;

first attachment means provided on said detent support plate;

second attachment means provided on a side of each of a plurality of different detent members, such different detent members being different from one another by the location of the notches thereby determining the throws of said shift lever depending on which different detent member is attached to said detent support plate; and said first and second attachment means of said detent support plate and each of said detent members being cooperative to selectively support any one of said detent members depending upon the desired throws of said shift lever.

2. The vehicle transmission shifter of claim 1 in which said first attachment means includes openings in said detent support plate and said second attachment means includes protuberances extending from one side of said detent member and extending into said openings in said detent support plate; and connection means for securing said protuberances in said openings.

3. In a vehicle transmission shifter mechanism having a shift lever shiftable to a plurality of different shift positions, said positions being determined by a pawl movable with said shift lever into and out of notches of a detent member, mounted on an upright detent support plate for said detent member; the improvement comprising:

means for constructing said mechanism for adapting it to be used for different throws of said shift lever whereby the same shift lever and pawl and the same detent support plate can be utilized for different vehicles having transmissions requiring different throws;

said means including first attachment means provided on said detent support plate;

second attachment means provided on each of a plurality of different detent members such different detent members being different from one another by the location of the notches thereby determining the throws of said shift lever depending on which different detent member is attached to said detent support plate;

said first and second attachment means of said detent support plate and each of said detent members being cooperative to selectively support any one of said detent members depending upon the desired throw of said shift lever;

said first attachment means including openings in said detent support plate and said second attachment means includes protuberances extending from one side of said detent member and extending into said openings; and connection means for securing said protuberances in said openings, said connection means being snap-in connections.

4. In the vehicle transmission shifter mechanism of claim 1;

a shift lever feel positioner means including a second detent member having undulations on which rides the end of a detent arm connected to said lever, said position of said undulations corresponding to the position of said notches to give a position feel to the operator as said lever and pawl is moved from one notch to another;

means for constructing said mechanism for adapting it to be used for different throws of said shift lever whereby the same shift lever and pawl and the same detent support plate can be utilized for different vehicles having transmissions requiring different throws;

said means including third attachment means provided on said detent support plate;

fourth attachment means provided on each of a plurality of different second detent members;

said second detent members being different by the locations of their undulations, one of said second detent members having its undulation located to accommodate the throw of said lever as determined by the position of the notches of one of said first detent members; and said third and fourth attachment means of said detent support plate and each of said second detent members being cooperative to selectively support any one of said second detent members.

5. The vehicle transmission shifter of claim 4 in which the first and second detent members are separate members.

6. The vehicle transmission shifter of claim 4 in which the first and second detent members are one integral piece.

7. The vehicle transmission shifter of claim 4 in which said first attachment means for said second detent members include sets of opening means each set having spaced opening portions, the opening portions of each set being located in close, spaced relationship to one another; said second attachment means include protuberance extending from one side of said detent member and extending into said openings in said detent support plate, said protuberances of each detent member being arranged in pairs with the protuberances of each pair being located in close, spaced relationship to one another corresponding to the positions of said sets of opening portions whereby each set of said opening portions receives a pair of said protuberances; and at least one of said protuberances of each pair of protuberances is slightly resilient and includes a hook portion whereby when said protuberance with said hook is forced into one of said opening portions, said protuberance flexes and then hooks onto said detent support plate.

8. In a vehicle transmission shifter mechanism having a shift lever shiftable to a plurality of different shift positions, said positions being determined by a pawl movable with said shift lever into and out of notches of a detent member, mounted on an upright detent support plate for said detent member; the improvement comprising:

means for constructing said mechanism for adapting it to be used for different throws of said shift lever whereby the same shift lever and pawl and the same detent support plate can be utilized for different vehicles having transmissions requiring different throws;

said means including first attachment means provided on said detent support plate;

second attachment means provided on each of a plurality of different detent members such different detent members being different from one another by the location of the notches thereby determining the throws of said shift lever depending on which different detent member is attached to said detent support plate; and said first and second attachment means of said detent support plate and each of said detent members being cooperative to selectively support any one of said detent members depending upon the desired throw of said shift lever, said first attachment means include sets of opening means each set having spaced opening portions, the opening portions of each set being located in close, spaced relationship to one another; said second attachment means includes protuberances extending from one side of said detent member, said protuberances of each detent member being arranged in pairs with the protuberances of each pair being located in close, spaced relationship to one another corresponding to the positions of said sets of opening portions whereby each set of said opening portions receives a pair of said protuberances; and at least one of said protuberances of each pair of protuberances is slightly resilient and includes a hook portion whereby when said protuberance with said hook is forced into one of said opening portions, said protuberance flexes and then hooks onto said detent support plate.

9. In a vehicle transmission shifter mechanism having a shift lever shiftable to a plurality of different shift positions, said positions being determined by a pawl movable with said shift lever into and out of notches of a first detent member, mounted on an upright detent support plate for said detent member; the improvement comprising:

said upright detent support plate comprising a plate having a top edge, opposite side edges, and a bottom edge;

an elongated base plate having a generally flat area located on a plane with a raised trough extending longitudinally along said base plate providing a flat centrally located top surface and a bottom surface spaced above said plane;

said bottom edge of said support plate having tabs oriented from front to rear and extending downwardly through openings provided in said trough, said tabs extending downwardly below said bottom surface and welded to said bottom surface along at least one side of each of said tabs.

10. The vehicle transmission shifter of claim 9 in which one tab is a front tab and the other is a rear tab and the one side of said front tab along which said front tab is welded to said bottom surface is at least opposite to the one side of said rear tab along which said rear tab is welded to said bottom surface.

11. The vehicle transmission shifter of claim 9 in which each tab is welded along both sides to said bottom surface.

12. In a vehicle transmission shifter mechanism having a shift lever shiftable to a plurality of different shift positions, said positions being determined by a pawl movable with said shift lever into and out of notches of a detent member, mounted on an upright detent support plate for said detent member; the improvement comprising:

a base support having a pair of spaced support means;

said lever comprising a solid block-like base member having a top end and a lower end, a horizontal opening at its lower end and a vertical opening;

said horizontal opening having a first axis;

an axle extending through said horizontal opening and rigidly secured to said spaced support means for pivotally mounting said base member about said first axis on said base support;

said base member extending upwardly and said vertical opening extending downwardly from said top end along a second axis intersecting the first axis;

a tube extending into and secured in said vertical opening, said tube having opposed slots located above and proximate to the top end of said base member;

an elongated cylindrical member located inside and slideably mounted along said second axis in said tube at said slots;

a pawl extending transversely through and secured to said elongated cylindrical member and extending through said slots;

biasing means located in said vertical opening below said elongated cylindrical member thereby applying an upwardly biasing force on said elongated cylindrical member and pawl; and means above said elongated cylindrical member for applying a force downwardly thereon in opposition to the biasing force of said biasing means.

13. The vehicle transmission shifter of claim 12 in which the block-like base member is a molded lubricious plastic.

14. The vehicle transmission shifter of claim 12 in which the block-like base member includes wing-like elements molded integrally therewith, extending outwardly along said first axis, and located adjacent said horizontal opening for centering said base member between said spaced support means.

15. The vehicle transmission shifter of claim 12 in which the block-like base member includes a pair of spaced legs through which said horizontal opening extends.

16. A method for constructing a vehicle transmission shifter mechanism having an upright detent member mounted on an upright detent support plate having an inverted U shaped with an upper portion and spaced legs pointed in a downward direction and project from ends of the upper portion to define a space between said legs and said upper portion; said space defined by an edge of said upper portion and said legs; said detent member having an edge portion with notches for receiving a pawl movable within said space; and a shift lever shiftable to a plurality of different shift positions, said positions being determined by a pawl movable vertically and horizontally in said space with said shift lever into and out of notches of said detent member; the improvement comprising:

the steps for constructing said mechanism for adapting it to be used for different throws of said shift lever whereby the same shift lever and pawl and the same detent support plate can be utilized for different vehicles having transmissions requiring different throws;

said steps including providing a detent support plate mounted on a base, said detent support plate having an upright detent member mounted on an upright detent support plate having an inverted U shape with an upper portion and spaced legs pointed in a downward direction and that project from the ends of the upper portion to define a space between said legs and upper portions; said space defined by an edge of said upper portion and said legs; said detent member having an edge portion with notches for receiving a pawl movable within said space; said detent support plate also having a first detent member attachment means;

providing a plurality of different pawl detent members, such different pawl detent members being different from one another by the location of the notches thereby determining the throws of said shift lever depending on which different pawl detent member is attached to said detent support plate, each of said different pawl detent members having identical second attachment mans for engaging said first attachment means wherein said means includes said edge portion of said detent member extending downwardly below said edge of said upper portion with said notches located below said edge of said upper portion so that said detent member provides the sole means for positioning said pawl and shift lever, any one of said pawl detent members being supportable by means of said first and second attachment means on said detent support plate;

selecting one of aid different pawl detent members depending on the desired throw of said shift lever and attaching said selected pawl detent member on said detent support plate by means of said first and second attachment means; and mounting a shift lever on said base.

17. The method of claim 16 in which said first attachment means includes openings in said detent support plate and said second attachment means includes protuberances extending from one side of said detent member and extending into said openings in said detent support plate; and attaching said detent member to said detent support plate by connection means for securing said protuberances in said openings.

18. The method of claim 17 in which said attachment step is by a snap-in connection.

19. The method of claim 16 in which said detent support plate includes a third detent member attachment means;

providing a plurality of shift lever feel position detent members each having undulations on which rides the end of a detent arm connected to said lever, said position of said undulations corresponding to the position of said notches to give a position feel to the operator as said lever and pawl is moved from one notch to another, each of said feel positioner detent members having identical fourth attachment means for engaging said third attachment means whereby any one of said feel position detent members is supportable by means of said third and fourth attachment means on said detent support plate, said feel position detent members being different by the locations of their undulations whereby each feel position detent member accommodates different throws of said lever each corresponding to the position of the notches of one of said pawl detent members; and selecting one of said feel position detent members that has undulations corresponding to said selected one of said pawl detent members and attaching said selected one of said feel position detent members on said detent support plate by means of said third and fourth attachment means.

20. The method of claim 19 in which said third attachment means includes second openings in said detent support plate and said fourth attachment means includes second protuberances extending from one side of said detent member and extending into said openings in said detent support plate; and attaching said detent member to said detent support plate by connection means for securing said second protuberances in said second openings.

21. The method of claim 20 in which said attachment step is by a snap-in connection.

22. The method of claim 21 in which said pawl detent members and feel position detent members are one integral piece whereby the first and second engagement means and the third and fourth attachment means are substantially simultaneously engaged to attach said integral piece to said detent support plate.

* * * * *

UNITED STATES PATENT AND TRADEMARK OFFICE
CERTIFICATE OF CORRECTION

PATENT NO. : 5,277,077
DATED : January 11, 1994
INVENTOR(S) : Charles Osborn

It is certified that error appears in the above-indentified patent and that said Letters Patent is hereby corrected as shown below:

Column 1, line 64:
    After "vehicles" insert --,--.

Column 3, line 6:
    "Fig 2" should be --Fig. 12--.

Column 3, line 61:
    After "attached" insert --,--.

Column 4, lines 24 and 25:
    "downward" should be --downwardly--.

Column 4, line 29:
    "portion 1" should be --portion 14--.

Column 5, line 1:
    "35kb," should be --35b--.

Column 11, claim 16, line 25:
    "project" should be --projecting--.

Column 12, claim 22, line 63:
    "engagement" should be --attachment--.

Signed and Sealed this

Twenty-third Day of August, 1994

Attest:

BRUCE LEHMAN

Attesting Officer        Commissioner of Patents and Trademarks